United States Patent [19]
Dolgy et al.

[11] 3,809,340
[45] May 7, 1974

[54] DEVICES FOR MOUNTING AN ENGINE ON AN AIRCRAFT PYLON

[76] Inventors: Andrei Emelyanovich Dolgy, ulitsa Ofitserskaya, 48; Jury Mikhailovich Balandin, ulitsa Gorkogo 167a, kv. 18, both of Zaporozhie; Viktor Vasilievich Shelepchikov, Leningradsky prospekt, 66 kv. 56; Vladimir Ivanovich Shutov, ulitsa Zoi Kosmodemyanskoi 18, kv. 49, both of Moscow, all of U.S.S.R.

[22] Filed: Dec. 26, 1972

[21] Appl. No.: 318,037

[52] U.S. Cl.......................... 244/54, 248/5
[51] Int. Cl............................. B64d 27/00
[58] Field of Search............ 244/54, 55, 58; 248/5

[56] References Cited
UNITED STATES PATENTS

| | | | |
|---|---|---|---|
| 3,042,349 | 7/1962 | Pirtle et al. | 248/5 |
| 3,288,404 | 11/1966 | Schmidt | 244/54 |
| 3,727,862 | 4/1973 | Kaufhold | 244/54 |
| 2,753,140 | 7/1956 | Hasbrouck et al. | 248/5 |
| 3,085,773 | 4/1963 | Anstrom et al. | 248/5 |

Primary Examiner—George E. A. Halvosa
Assistant Examiner—Sherman D. Basinger
Attorney, Agent, or Firm—Waters, Roditi, Schwartz & Nissen

[57] ABSTRACT

In the forward suspension plane relative to the flight direction, there are provided two struts and a trunnion therebetween. One end of each strut is pivotally connected to the aircraft pylon, while the opposite end of each strut is pivotally connected to the engine. In the rearward suspension plane relative to the flight direction, there are provided at least three struts one end of each being pivotally connected to the aircraft pylon while the other end is pivotally connected to the engine, a means for mounting the engine on the struts and the trunnion being located laterally on the engine in such a way as to provide for a cantilever suspension of the engine on the aircraft pylon.

1 Claim, 5 Drawing Figures

PATENTED MAY 7 1974 3,809,340

DEVICES FOR MOUNTING AN ENGINE ON AN AIRCRAFT PYLON

The present invention concerns aircraft manufacturing generally and more particularly relates to devices for mounting an engine on an aircraft pylon in the forward and rearward suspension planes.

The present invention will be preferably applied to the cantilever type mounting of turbofan engines on an aircraft when the engine facing the air flow is suspended on a pylon.

Aircraft engines are usually mounted on frames of suspended on struts fixed to the fuselage thus having as a result a large engine cowling outline and, consequently, a great power plant cross-section and worsened power plant weight characteristics. Besides, due to the difficult access to the engine and its accessories, the engine servicing is substantially handicapped.

Known in the art is a device for mounting an engine on an aircraft pylon in the forward and rearward suspension planes. Two struts with a trunnion therebetween are located in the forward suspension plane relative to the flight direction. One end of each of the struts is pivotally fixed to the aircraft pylon, whereas the other ends are pivotally connected to the engine. One end of the trunnion is rigidly fixed to the aircraft pylon to take up the engine thrust, the other end being pivotally connected to the engine. A strut located in the rearward suspension plane relative to the flight direction is fixed with its one end to the aircraft pylon and with the opposite end to the engine. The flanges by means of which the engine is fixed to the struts and the trunnion, are located over the thrust vector located in the flight direction. So, this mounting ensures vertical suspension of the engine. The vertical suspension of an engine mounted on the fuselage by means of a pylon results in significant dimensions of the power plant and, consequently, increases the power plant cross section and affects the weight characteristics of the power plant. Besides, this type of the engine mounting impedes the access to the flanges fixing the engine to the pylon thus impairing the engine servicing. For example, to replace the engine, its cowling should be removed.

It is an object of the present invention to minimize the dimensions and, consequently, the cross-section of a power plant.

Another object of the present invention is to provide a versatile engine mounting device to ensure the interchangeability of the port, starboard and the center power plants.

Still another object of the present invention is to decrease the weight of the engine power plant thus improving its weight characteristics.

This is achieved by that in a device for mounting an engine on an aircraft pylon in the forward and rearward suspension planes having, in the forward suspension plane relative to the flight direction, two struts one end of each being pivotally connected to the pylon of an aircraft while the opposite end is pivotally connected to the engine, and located between the struts, a trunnion one end of which being pivotally connected to the engine whereas the opposite end is connected to the pylon, there are provided, according to the invention, in the rearward plane of suspension, at least three struts one end of each being pivotally connected to the aircraft pylon while the opposite end is pivotally connected to the engine, the means for mounting the engine on the struts and the trunnion being located laterally on the engine so as to ensure a cantilever suspension of the engine.

It is preferable that the mounting means, fixing the engine to the struts and the trunnion, be positioned on the engine laterally and symmetrically relative to the vertical plane containing the engine longitudinal axis.

Such embodiment provides for a cantilever suspension of the engine on the aircraft pylon and substantially decreases the weight and cross-section dimensions of the power plant. The novel device is versatile and ensures an interchangeability of the port, starboard and center power plants. The cantilever suspension of the aircraft engine provides for an easy access to the engine units for the purpose of servicing during the engine operational life due to the fact that the engine cowing can be formed of two parts, detachable along the engine axis. To provide for the all-round access to the engine with the exception of the area occupied by the pylon, it is sufficient to longitudinally dismount the cowling.

Other objects and advantages of the present invention will become more evident from the following description of a preferred embodiment thereof taken in conjunction with the accompanying drawings.

Figure 1:
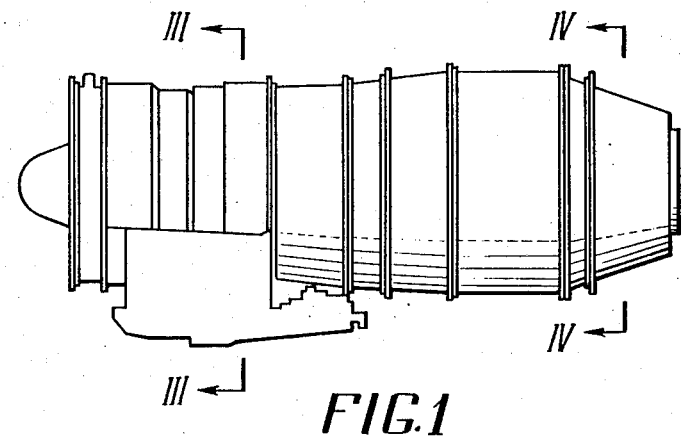
FIG. 1 is a diagramatic view of a turbofan engine with the device according to the present invention located in forward III — III and rearward IV — IV planes of suspension of the engine on the aircraft pylon.

The engine mounting in the forward III — III and rearward IV — IV planes of suspension on the aircraft pylon is shown in FIG. 1.

Figure 2:
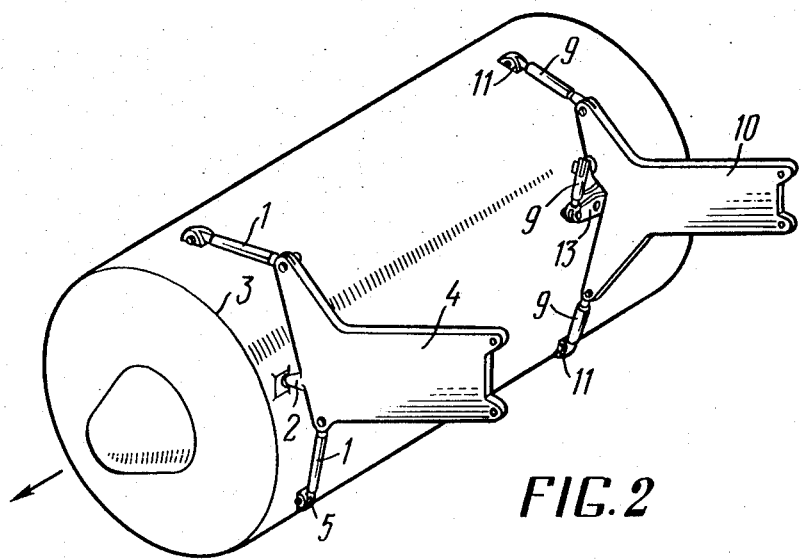
FIG. 2 is a perspective view of the device for mounting an engine on the aircraft pylon according to the present invention in the forward III — III and rearward IV — IV suspension planes.
Figure 3:
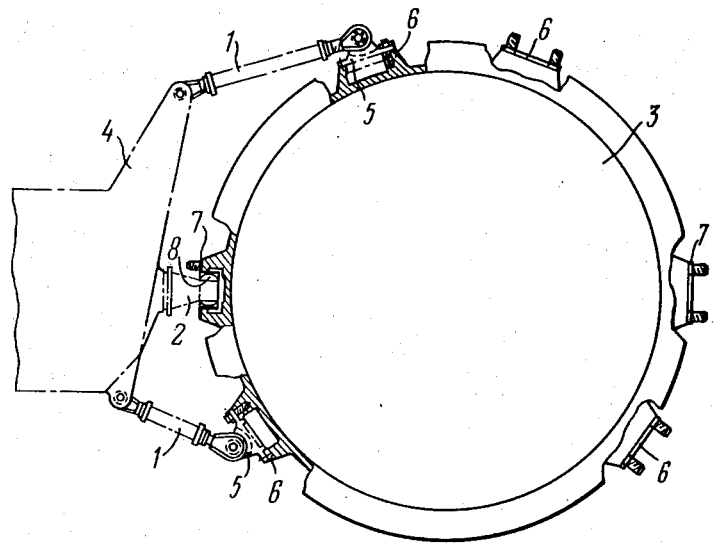
FIG. 3 is the device for mounting the starboard engine on the aircraft pylon according to the present invention in the forward III — III plane of suspension.

Two struts 1 (FIG. 2) with a trunnion 2 therebetween are located in the forward III — III plane of the engine suspension. The struts 1 are of the turn-buckle type to provide for the alignment of the engine 3. One end of each strut 1 is pivotally connected to a support 4 of the aircraft pylon and the other end of each strut 1 is pivotally connected to a support 5 rigidly secured to a flange 6 (FIG. 3) of the engine 3. The trunnion 2 by its one end is rigidly connected to the support 4 of the aircraft pylon and pivotally connected to a flange 7 of the engine 3, by the other. The flange 7 is designed to receive a ball trunnion 8. The trunnion 2 is mounted on the bail trunnion 8 with the possibility of a radial movement to compensate for the radial thermal expansion of the engine 3. In the rearward plane IV — IV of the engine suspension there are provided four struts 9 (FIG. 2) of the turn-buckle type.

Figure 5:
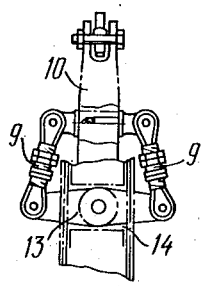
FIG. 5 is a view taken along the arrow A of FIG. 4.
Figure 4:
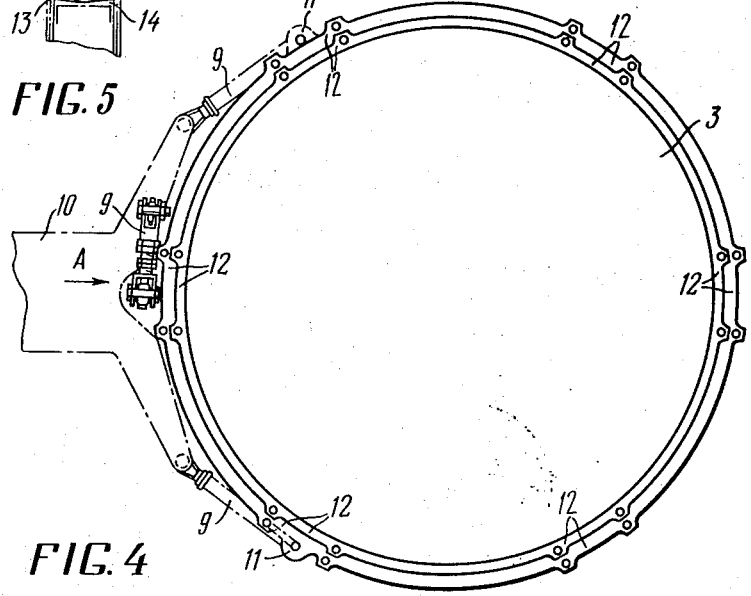
FIG. 4 is an embodiment of the device for the starboard engine mounting on the aircraft pylon in the rearward plane IV — IV of suspension, according to the present invention.

One end of each strut 9 is pivotally connected to a support 10 of the aircraft pylon while the opposite end of each one of them is pivotally mounted on a support 11 rigidly connected to a flange 12 (FIG. 4) of the engine 3, and one end of each of the two other struts 9 (FIGS. 2 and 5) is pivotally connected to the support of the aircraft pylon whereas the opposite ends of these struts are pivotally fixed to a transverse member 13. The transverse member 13 is in turn fixed pivotally to the support 14 rigidly fixed to the flange 12 (FIG. 4) of the engine 3. To provide for the interchangeability of the part, starboard and the center power plants, the flanges 6, 7 and 12 are placed symmetrically relative to the vertical plane containing the longitudinal axis of the engine 3.

What is claimed is:

1. A device for mounting an engine on an aircraft pylon in forward and rearward suspension planes, comprising:

a. a first attachment unit located in the forward suspension plane, said unit including at least one spherical bearing pivot means secured to said engine proximate a horizontal sectional plane extending through the center of the engine, and adapted to receive axial and vertical loads; at least two struts located so as to extend tangentially to said engine and adapted to receive lateral loads, one of said struts being pivotally connected at one end thereof to said engine at a point arranged above said horizontal sectional plane and with the other end thereof being pivotally connected with said aircraft pylon of the aircraft, the other of said struts being pivotally connected at one end thereof to said engine at a point arranged below said horizontal sectional plane and with the other end thereof, being pivotally connected with said aircraft pylon; and b. a second attachment unit located in the rearward suspension plane, said unit including second bearing pivot means pivotally connected to said engine at least at three points arranged in a plane extending normal to said horizontal sectional plane and being axially spaced from the spherical bearing pivot means of said forward suspension plane, and being adapted to receive vertical and lateral loads while allowing for the axial expansion of the engine, and two struts arranged to extend generally tangentially to said engine, one of said struts being pivotally connected to said engine at a point located above said horizontal sectional plane, and the other strut being pivotally connected at the point located below said horizontal sectional plane; and at least one further strut located between said tangential struts of said second bearing means having one end thereof pivotally connected with said engine and the other end thereof pivotally connected to said aircraft pylon.

* * * * *